May 15, 1945.  E. J. DAWSON  2,376,038
EXTENSOMETER
Filed Aug. 13, 1943
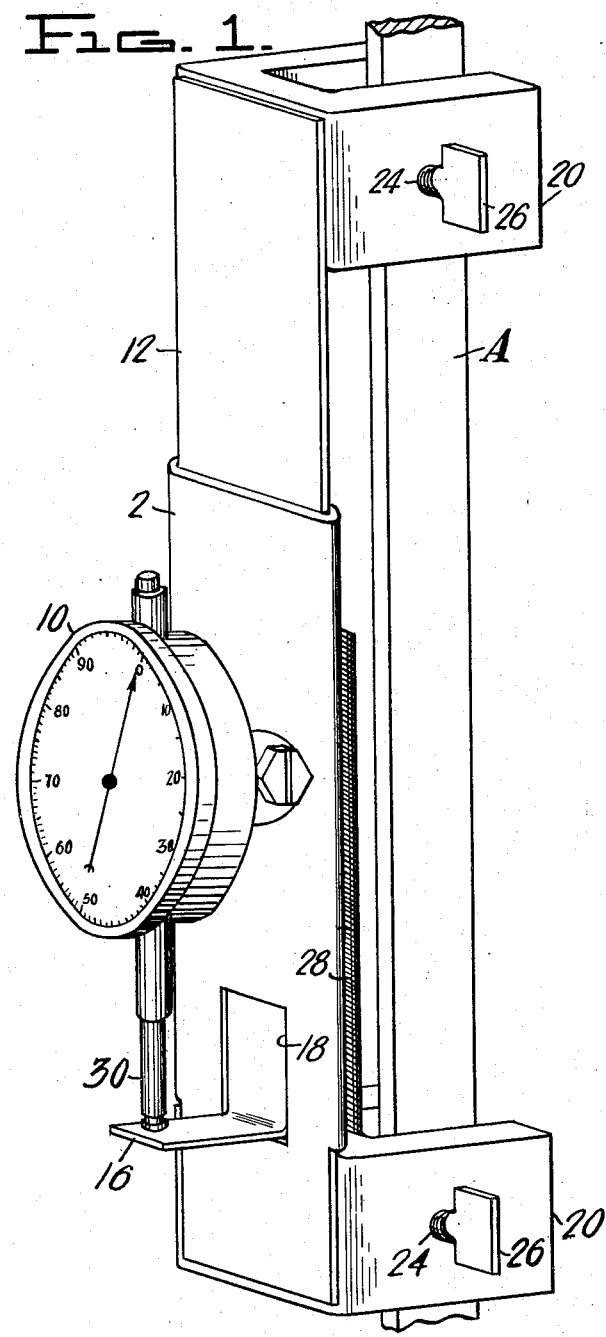
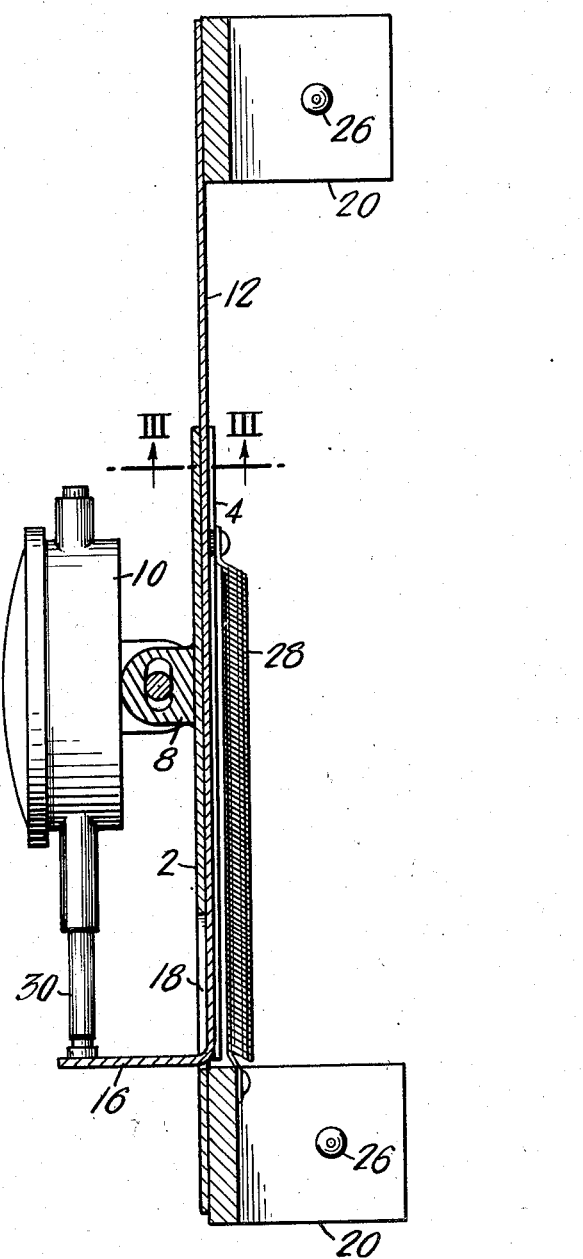
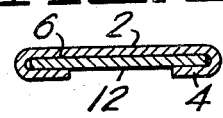
INVENTOR:
EDWARD J. DAWSON,
BY: John E. Jackson
ATTORNEY Patented May 15, 1945

2,376,038

UNITED STATES PATENT OFFICE 2,376,038

EXTENSOMETER

Edward J. Dawson, East Gary, Ind.

Application August 13, 1943, Serial No. 498,519

4 Claims. (Cl. 33—147)

This invention relates to an extensometer and more particularly to an extensometer which can be used for determining the yield point of tensile specimens.

It is often necessary or desirable to determine the yield point of tensile specimens when no automatic recording apparatus giving the exact stress strain curve is available.

When a load is applied to a tensile specimen, the motion is at first slow and uniform, but suddenly becomes very rapid as the yield point is reached. This acceleration is a very accurate and delicate criterion for the first occurrence of the yield point and permits its determination with sufficient accuracy for all practical purposes.

It is an object of this invention to provide a device for determining the yield point by observing the acceleration of the rate of motion during tensile testing.

This and other objects will be more apparent after referring to the following specification and attached drawing in which:

Figure 1 is a perspective view of the extensometer of the present invention;

Figure 2 is a cross sectional view showing the spring and gauge mounting; and

Figure 3 is a section taken on the line III—III of Figure 2.

Referring more particularly to the drawing the reference numeral 2 indicates a guide member which consists essentially of a plate having its edges 4 bent over to form guides 6. Mounted on the guide member 2 is a bracket 8 which adjustably supports a micrometer gauge 10. A member 12 is mounted for sliding movement in the guide 6, one end of the member being reduced in width and bent at right angles to form a rest 16 which extends through a slot 18 in the guide member 2. Attached to the outer end of each of the members 2 and 12 is a U-shaped member 20. Each of the U-shaped members is provided with two threaded holes 24 for receiving set screws 26. On the back of the instrument a coil tension spring 28 is provided, one end being attached to the member 20 and the other end being attached to the member 12. This keeps the two sections in the snug fit necessary for the adjustment of the dial gauge and returns them to their original position after they have been pulled apart.

The operation of the extensometer is as follows:

A test specimen A having spaced apart gauge marks is placed in a tensile machine in a vertical position and the extensometer is placed in position on the test specimen A with the set screws 26 in the gauge marks. In this position the plunger 30 on the micrometer gauge 10 contacts the rest 16 as shown in Figure 1. When the load is applied to the test specimen, parts 2 and 12 begin to slide with respect to each other, this motion being reflected by the movement of the hand of the dial gauge. At first this motion is slow and uniform, but as the yield point is reached, the motion becomes very rapid. This acceleration of the rate of motion is a very accurate and delicate criterion for the first occurrence of the yield point and the operator by observing the load at the time of rapid acceleration can determine the yield point with sufficient accuracy for any practical purpose.

While one embodiment of the invention has been shown and described, it will be apparent that other adaptations and modifications may be made without departing from the scope of the following claims.

I claim:

1. An extensometer for determining the yield point of a test specimen comprising a guide member, a member adapted to slide in said guide member, an indicator mounted on one of said members, a plunger connected to said indicator, a rest for actuating said plunger to change the position of said indicator, said rest being attached to the other of said members, a U-shaped member having its web attached to the outer end of each of said members on the side opposite said indicator with its flanges extending perpendicular thereto, and means on each U-shaped member for gripping the test specimen.

2. An extensometer for determining the yield point of a test specimen comprising a guide member, a member adapted to slide in said guide member, an indicator mounted on one of said members, a plunger connected to said indicator, a rest for actuating said plunger to change the position of said indicator, said rest being attached to the other of said members, a U-shaped member having its web attached to the outer end of each of said members on the side opposite said indicator with its flanges extending perpendicular thereto, means on each U-shaped member for gripping the test specimen, and a spring extending between and attached to said members to keep the plunger and rest in contact with each other.

3. An extensometer for determining the yield point of a test specimen comprising a plate member provided with a guide along each longitudinal edge, a second plate member adapted to slide in said guides, an indicator mounted on one of said members, a plunger connected to said indicator, a rest for actuating said plunger to change the position of said indicator, said rest being attached to the other of said members, a U-shaped member having its web attached to the outer end of each of said members on the side opposite said indicator with its flanges extending perpendicular thereto, and means on each U-shaped member for gripping the test specimen.

4. An extensometer for determining the yield point of a test specimen comprising a plate member provided with a guide along each longitudinal edge, a second plate member adapted to slide in said guides, an indicator mounted on one of said members, a plunger connected to said indicator, a rest for actuating said plunger to change the position of said indicator, said rest being attached to the other of said members, a U-shaped member having its web attached to the outer end of each of said members on the side opposite said indicator with its flanges extending perpendicular thereto, means on each U-shaped member for gripping the test specimen, and a spring extending between and attached to said plate members to keep the plunger and rest in contact with each other.

EDWARD J. DAWSON.